United States Patent
Oishi et al.

(10) Patent No.: US 9,661,212 B2
(45) Date of Patent: May 23, 2017

(54) IMAGE ACQUISITION DEVICE AND FOCUSING METHOD FOR IMAGE ACQUISITION DEVICE

(71) Applicant: HAMAMATSU PHOTONICS K.K., Hamamatsu-shi, Shizuoka (JP)

(72) Inventors: Hideshi Oishi, Hamamatsu (JP); Fumio Iwase, Hamamatsu (JP); Masatoshi Okugawa, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/786,574

(22) PCT Filed: Mar. 7, 2014

(86) PCT No.: PCT/JP2014/055987
§ 371 (c)(1),
(2) Date: Oct. 23, 2015

(87) PCT Pub. No.: WO2014/174919
PCT Pub. Date: Oct. 30, 2014

(65) Prior Publication Data
US 2016/0156832 A1    Jun. 2, 2016

(30) Foreign Application Priority Data

Apr. 26, 2013    (JP) .................................. 2013-094079
Jun. 11, 2013    (JP) .................................. 2013-122959

(51) Int. Cl.
*H04N 5/225*    (2006.01)
*H04N 5/232*    (2006.01)
(Continued)

(52) U.S. Cl.
CPC ......... *H04N 5/23212* (2013.01); *G02B 7/346* (2013.01); *G02B 7/36* (2013.01);
(Continued)

(58) Field of Classification Search
None
See application file for complete search history.

(56) References Cited

U.S. PATENT DOCUMENTS 6,677,565 B1 *    1/2004  Wahl .................... G02B 7/346
                                                    250/201.3
7,518,652 B2     4/2009  Olson et al.
(Continued)

FOREIGN PATENT DOCUMENTS

CN        101031837       9/2007
CN        102645160       8/2012
(Continued)

OTHER PUBLICATIONS

International Preliminary Report on Patentability dated Nov. 5, 2015 for PCT/JP2014/055987.
(Continued)

*Primary Examiner* — Twyler Haskins
*Assistant Examiner* — Dwight C Tejano
(74) *Attorney, Agent, or Firm* — Drinker Biddle & Reath LLP

(57) ABSTRACT

In an image acquisition device, an optical path difference generating member can form an optical path length difference of a second light image without splitting light in a second optical path. This can suppress the quantity of light required for the second optical path to obtain information of the focal position, whereby a quantity of light can be secured for a first imaging device to capture an image. The image acquisition device synchronizes the movement of a predetermined part of a sample within a field of an objective lens with rolling readout such that each pixel column of a second imaging device is exposed to a light image of the predetermined part in the sample.

5 Claims, 17 Drawing Sheets

(51) Int. Cl.

| | | |
|---|---|---|
| *G02B 7/34* | (2006.01) | |
| *G02B 7/36* | (2006.01) | |
| *G02B 21/24* | (2006.01) | |
| *G02B 21/36* | (2006.01) | |
| *G02B 21/18* | (2006.01) | |
| *H04N 5/235* | (2006.01) | |
| *H04N 5/247* | (2006.01) | |
| *H04N 5/262* | (2006.01) | |

(52) U.S. Cl.
CPC ............ *G02B 7/365* (2013.01); *G02B 21/18* (2013.01); *G02B 21/244* (2013.01); *G02B 21/245* (2013.01); *G02B 21/361* (2013.01); *G02B 21/365* (2013.01); *G02B 21/367* (2013.01); *H04N 5/2351* (2013.01); *H04N 5/2353* (2013.01); *H04N 5/247* (2013.01); *H04N 5/2628* (2013.01)

(56) References Cited

U.S. PATENT DOCUMENTS

| | | | |
|---|---|---|---|
| 2005/0258335 A1* | 11/2005 | Oshiro | G02B 21/245 250/201.3 |
| 2005/0270611 A1* | 12/2005 | Oshiro | G02B 21/245 713/186 |
| 2006/0017001 A1* | 1/2006 | Donders | G02B 21/0036 250/390.07 |
| 2008/0049309 A1* | 2/2008 | Tanikawa | G02B 21/367 359/363 |
| 2009/0073305 A1 | 3/2009 | Yuba et al. | |
| 2015/0022651 A1* | 1/2015 | Wu | G02B 21/025 348/79 |

FOREIGN PATENT DOCUMENTS

| | | |
|---|---|---|
| CN | 102687056 | 9/2012 |
| EP | 1 830 217 | 9/2007 |
| EP | 1 865 354 | 12/2007 |
| EP | 2 490 069 | 8/2012 |
| JP | H08-320430 A | 12/1996 |
| JP | 2006-343573 A | 12/2006 |
| JP | 2008-507719 A | 3/2008 |
| JP | 2009-069197 A | 4/2009 |
| JP | 2009-522604 A | 6/2009 |
| JP | 2010-256530 A | 11/2010 |
| JP | 2011-081211 | 4/2011 |
| JP | 2012-042970 A | 3/2012 |
| JP | 2012-073285 A | 4/2012 |
| JP | 2012-108184 A | 6/2012 |
| JP | 2012-138068 A | 7/2012 |
| JP | 2012-212155 A | 11/2012 |
| WO | WO-2005/114293 A1 | 12/2005 |
| WO | WO-2006/008637 A1 | 1/2006 |
| WO | WO-2007/079397 A2 | 7/2007 |
| WO | WO 2007/095090 | 8/2007 |
| WO | WO 2010/048584 | 4/2010 |
| WO | WO 2011/080670 | 7/2011 |
| WO | WO 2011/145016 | 11/2011 |
| WO | WO 2011/161594 | 12/2011 |
| WO | WO-2012/002893 A1 | 1/2012 |

OTHER PUBLICATIONS

International Preliminary Report on Patentability dated Nov. 5, 2015 for PCT/JP2014/055988.

International Preliminary Report on Patentability dated Nov. 5, 2015 for PCT/JP2014/061180.

International Preliminary Report on Patentability dated Nov. 5, 2015 for PCT/JP2014/061182.

* cited by examiner

*Fig.10*
(a)
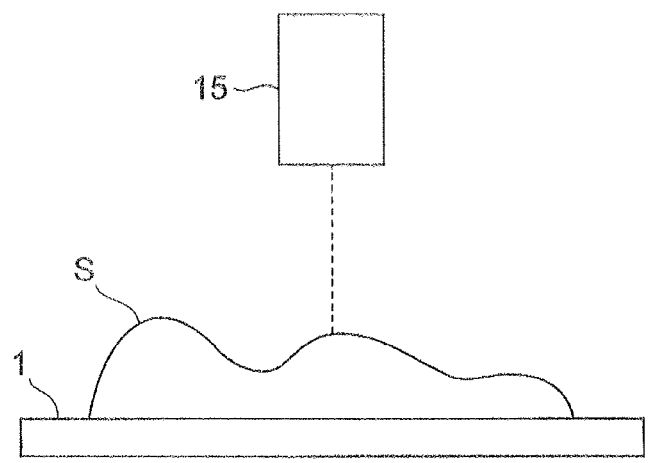
(b)
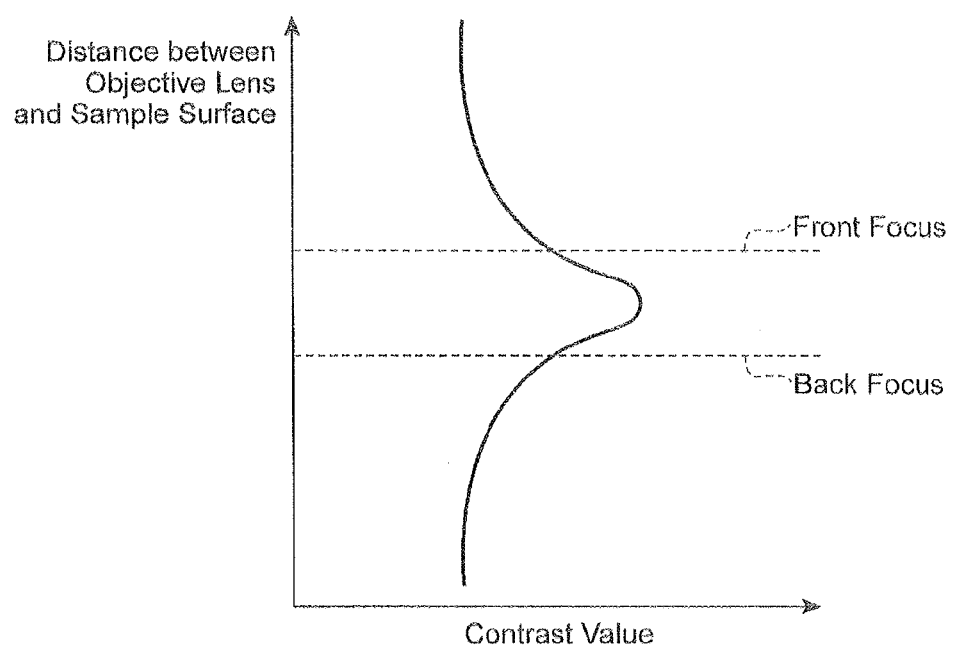

Fig.11
(a)
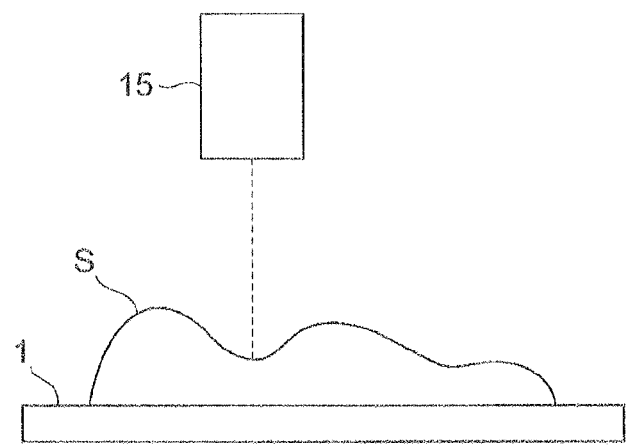
(b)
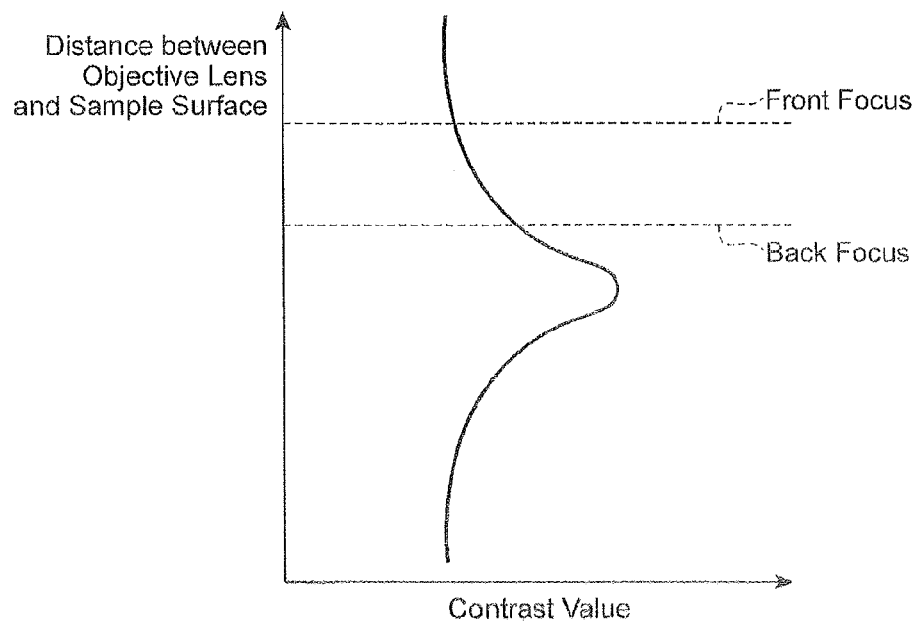

*Fig.12*
(a)
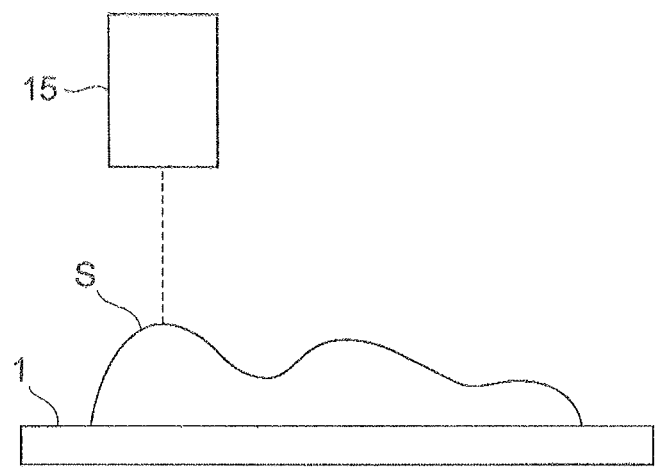
(b)
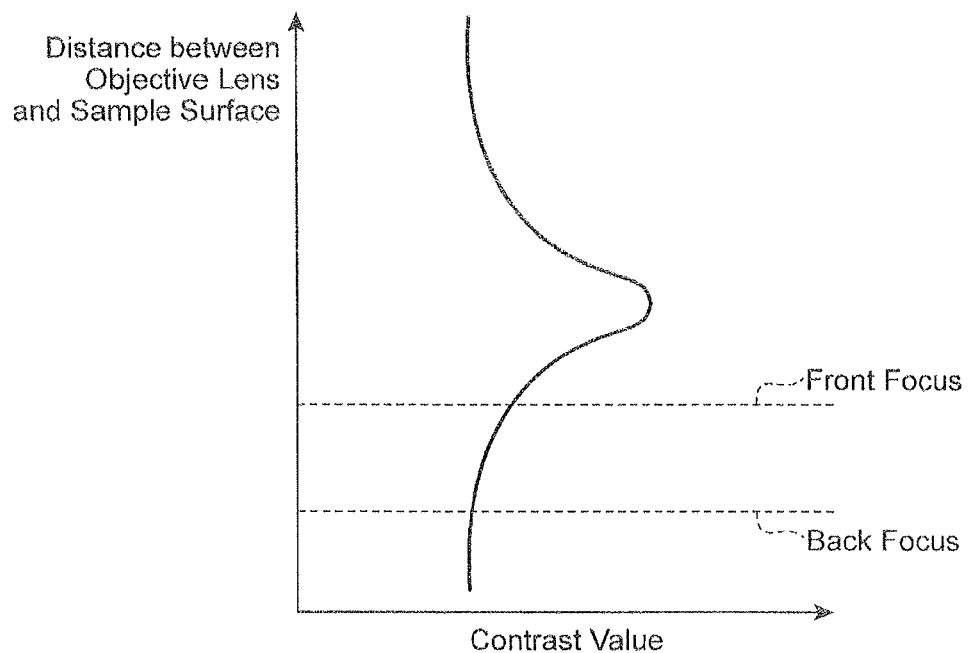

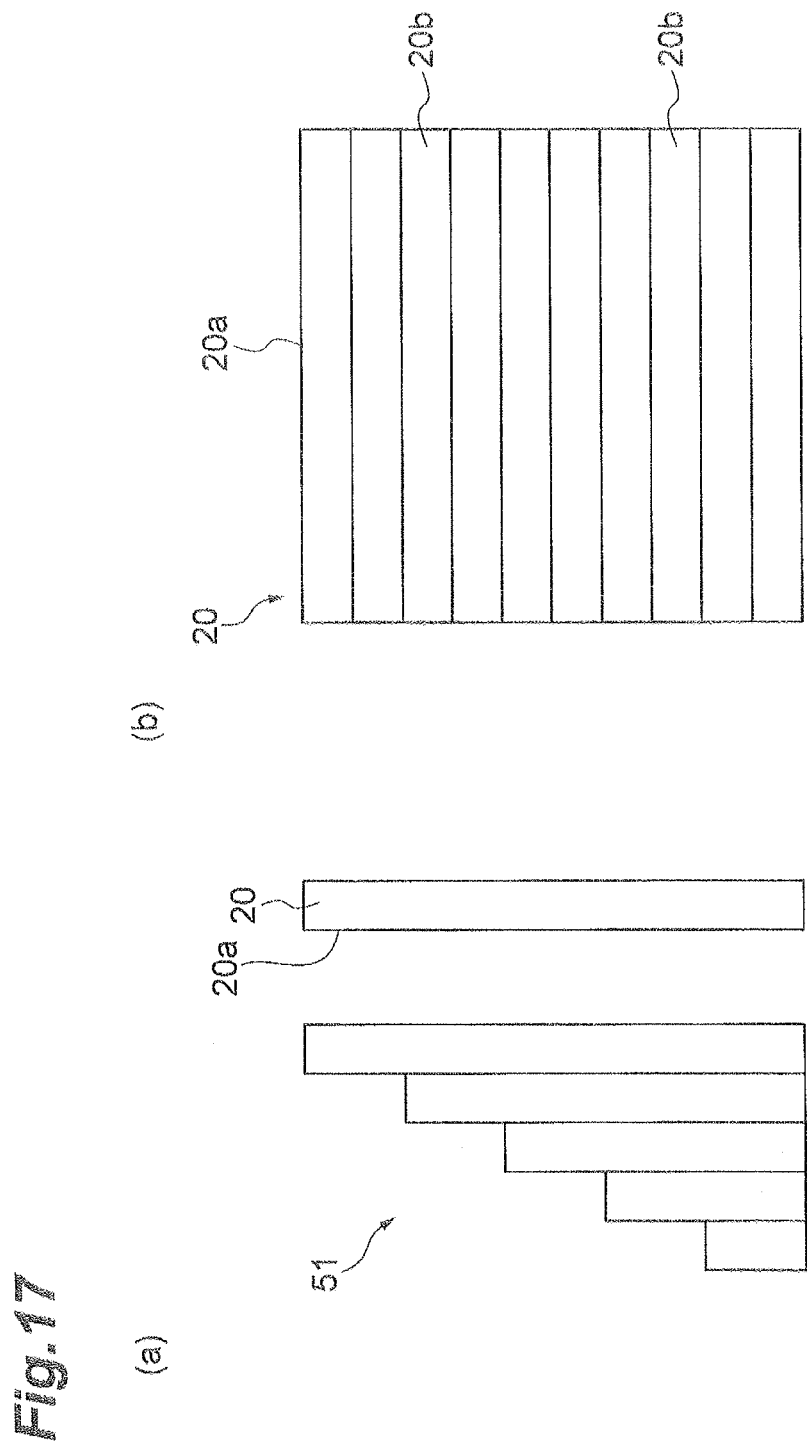

IMAGE ACQUISITION DEVICE AND FOCUSING METHOD FOR IMAGE ACQUISITION DEVICE

TECHNICAL FIELD

The present invention relates to an image acquisition device and a focusing method for the image acquisition device.

BACKGROUND ART

Known as an example of conventional image acquisition devices is a device described in Patent Literature 1. This device splits light from a subject with a half prism and receives the light with a photoelectric transducer constituted by a two-dimensional image pickup element such as a CCD area image sensor. A control circuit for the photoelectric transducer has a scan area setting unit which can arbitrarily set two scan areas for two-dimensionally scanning the light-receiving surface. Focusing control is executed according to a focus deviation signal of the light received by the two scan areas set by the scan area setting unit.

CITATION LIST

Patent Literature

Patent Literature 1: Japanese Patent Application Laid-Open No. H08-320430

SUMMARY OF INVENTION

Technical Problem

The above-mentioned conventional device splits the light from the subject with the half prism. This makes it difficult for the photoelectric transducer to secure a quantity of light, which may lower the accuracy of detecting a focal position of a sample. As the quantity of light for detecting the focal position increases, the quantity of light for imaging the subject decreases, which may make it hard to secure the quantity of light at the time of imaging.

For solving the problems mentioned above, it is an object of the present invention to provide an image acquisition device and a focusing method therefor which can secure a quantity of light at the time of imaging and accurately detect focal positions of samples.

Solution to Problem

For solving the problems mentioned above, the image acquisition device in accordance with the present invention comprises a stage for mounting a sample; a light source for emitting light to the sample; a lightguide optical system including an objective lens arranged so as to oppose the sample on the stage and light splitting means for splitting an optical image of the sample into a first optical path for image acquisition and a second optical path for focus control; field drive means for moving a field position of the objective lens with respect to the sample; first imaging means for acquiring a first image formed by a first optical image split into the first optical path; second imaging means for acquiring a second image formed by a second optical image split into the second optical path; focus calculation means for analyzing the second image and calculating focus information of the sample according to a result of the analysis; operation control means for controlling operations of the field drive means and second imaging means; and an optical path difference generating member for generating an optical path difference in the second optical image along an in-plane direction of an imaging surface of the second imaging means; the second imaging means has a two-dimensional image pickup element, adapted to perform rolling readout, including a plurality of pixel columns; the operation control means preferably synchronizes movement of a predetermined part of the sample within the field of the objective lens caused by the field drive means with rolling readout of the two-dimensional image pickup element such that each pixel column of the two-dimensional image pickup element is exposed to the optical image of the predetermined part in the sample.

By arranging the optical path difference generating member, this image acquisition device can form an optical path length difference of the second optical image without splitting light in the second optical path for focus control. This can suppress the quantity of light required for the second optical path to obtain information of a focal position, whereby a quantity of light can be secured for the first imaging means to capture an image. By utilizing a delay in image data readout timings among pixel columns in the rolling readout, the image acquisition device synchronizes the movement of a predetermined part (the same part) of the sample within the field of the objective lens with the rolling readout such that each pixel column of the second imaging means is exposed to an optical image of the predetermined part in the sample. Since the optical path difference generating member is arranged in the second optical path, image data from each pixel column includes contrast information equivalent to that obtained when the focal position of the objective lens is changed in the same part of the sample, whereby the focus information can be calculated rapidly and accurately according to the contrast information.

Preferably, the optical path difference generating member has a flat surface tilted from a plane orthogonal to an optical axis of the second optical path. This enables the optical path difference generating member to form the optical path difference of the second optical image favorably.

Preferably, the focus calculation means calculates the focus information of the sample according to a difference in contrast values of image data read out from at least two pixel columns in the pixel columns of the two-dimensional image pickup element. In this case, the second imaging means can acquire each of a (front focus) optical image whose focus is in front of the optical image incident on the first imaging means and a (back focus) optical image whose focus is behind the incident optical image. By using the difference in contrast values of their image data, the focus information of the sample can be calculated accurately.

Preferably, the focus calculation means calculates the focus information of the sample according to a distribution of contrast values in image data read out from the pixel columns of the two-dimensional image pickup element. In this case, the focus information of the sample can be calculated accurately according to the distribution of contrast values in the image data.

The focusing method for an image acquisition device in accordance with the present invention is a focusing method for an image acquisition device comprising a stage for mounting a sample; a light source for emitting light to the sample; a lightguide optical system including an objective lens arranged so as to oppose the sample on the stage and light splitting means for splitting an optical image of the sample into a first optical path for image acquisition and a second optical path for focus control; field drive means for moving a field position of the objective lens with respect to the sample; first imaging means for acquiring a first image formed by a first optical image split into the first optical path; second imaging means for acquiring a second image formed by a second optical image split into the second optical path; focus calculation means for analyzing the second image and calculating focus information of the sample according to a result of the analysis; and operation control means for controlling operations of the field drive means and second imaging means; the method comprising arranging an optical path difference generating member for generating an optical path difference in the second optical image along an in-plane direction of an imaging surface of the second imaging means; using as the second imaging means a two-dimensional image pickup element, adapted to perform rolling readout, including a plurality of pixel columns; and causing the operation control means to synchronize movement of a predetermined part of the sample within the field of the objective lens caused by the field drive means with rolling readout of the two-dimensional image pickup element such that each pixel column of the two-dimensional image pickup element is exposed to the optical image of the predetermined part in the sample.

By arranging the optical path difference generating member, this focusing method for an image acquisition device can form an optical path length difference of the second optical image without splitting light in the second optical path for focus control. This can suppress the quantity of light required for the second optical path to obtain information of a focal position, whereby a quantity of light can be secured for the first imaging means to capture an image. By utilizing a delay in image data readout timings among pixel columns in the rolling readout, the focusing method for an image acquisition device synchronizes the movement of a predetermined part (the same part) of the sample within the field of the objective lens with the rolling readout such that each pixel column of the second imaging means is exposed to an optical image of the predetermined part in the sample. Since the optical path difference generating member is arranged in the second optical path, image data from each pixel column includes contrast information equivalent to that obtained when the focal position of the objective lens is changed in the same part of the sample, whereby the focus information can be calculated rapidly and accurately according to the contrast information.

Advantageous Effects of Invention

The present invention can secure a quantity of light at the time of imaging and accurately detect focal positions of samples.

BRIEF DESCRIPTION OF DRAWINGS

FIG. 10 is a diagram illustrating results of analysis of contrast values in a case where the distance to a surface of the sample coincides with the focal length of the objective lens;

FIG. 11 is a diagram illustrating results of analysis of contrast values in a case where the distance to the surface of the sample is longer than the focal length of the objective lens;

FIG. 12 is a diagram illustrating results of analysis of contrast values in a case where the distance to the surface of the sample is shorter than the focal length of the objective lens;

FIG. 17 is a diagram illustrating still other modified examples of the optical path difference generating member.

DESCRIPTION OF EMBODIMENTS

In the following, preferred embodiments of the image acquisition device and focusing method for an image acquisition device in accordance with the present invention will be explained in detail with reference to the drawings.

Figure 1:
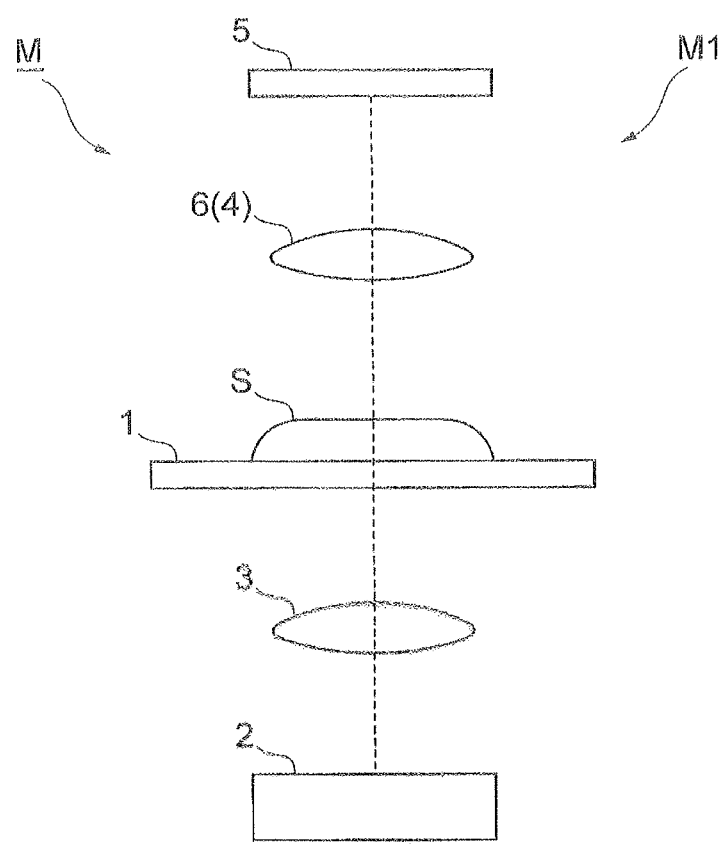
FIG. 1 is a diagram illustrating an embodiment of a macro-image acquisition device constituting an image acquisition device in accordance with the present invention.
Figure 2:
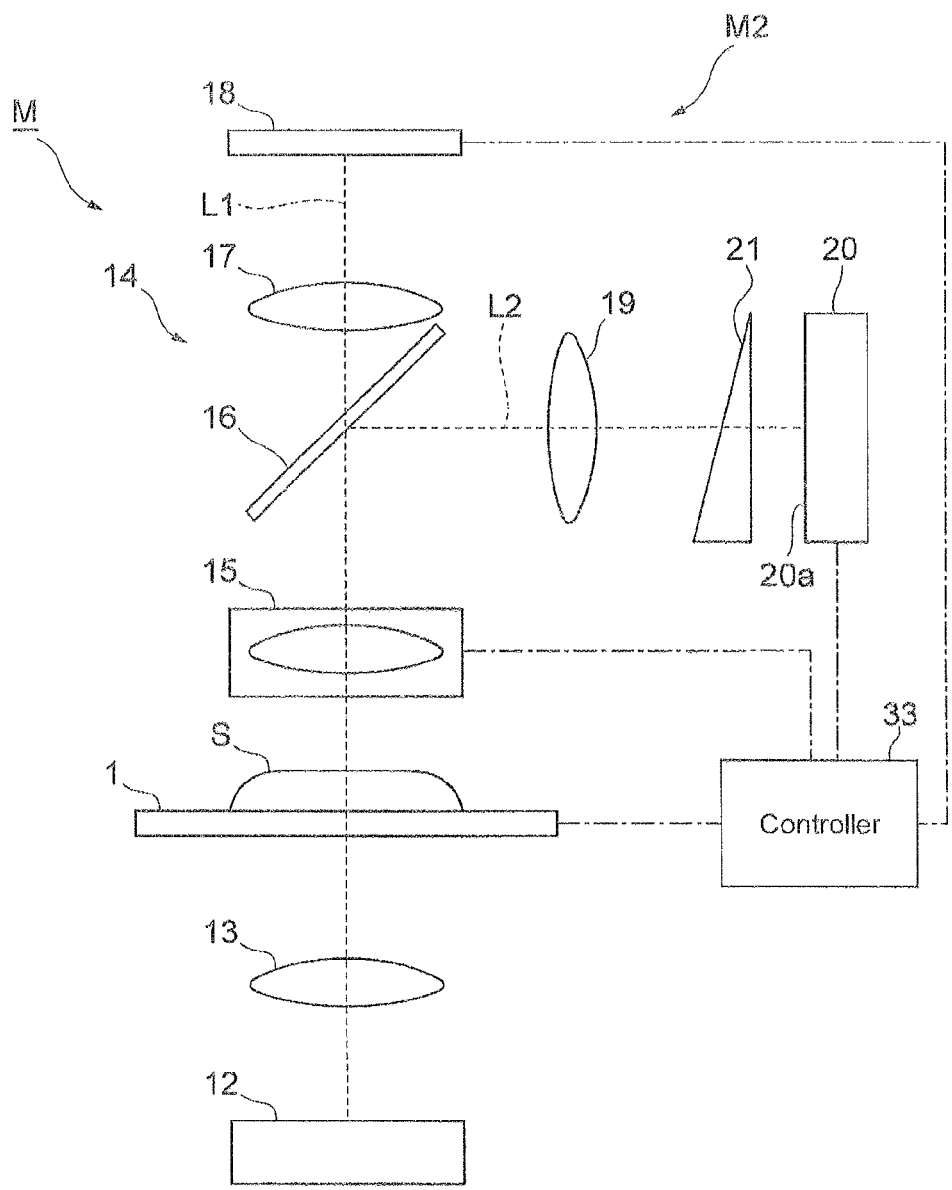
FIG. 2 is a diagram illustrating a micro-image acquisition device constituting the image acquisition device in accordance with the present invention.

FIG. 1 is a diagram illustrating an embodiment of a macro-image acquisition device constituting the image acquisition device in accordance with the present invention. FIG. 2 is a diagram illustrating an embodiment of a micro-image acquisition device constituting the image acquisition device in accordance with the present invention. As illustrated in FIGS. 1 and 2, an image acquisition device M is constituted by a macro-image acquisition device M1 which acquires a macro image of a sample S and a micro-image acquisition device M2 which acquires a micro image of the sample S. The image acquisition device M is a device which sets a plurality of linear divisional regions 40 (see FIG. 6), for example, for a macro image acquired by the macro-image acquisition device M1, causes the micro-image acquisition device M2 to acquire the divisional regions 40 under a high magnification, and combines them, thereby generating a virtual slide image which is a digital image.

As illustrated in FIG. 1, the macro-image acquisition device M1 is equipped with a stage 1 on which the sample S is mounted. An example of the stage 1 is an XY stage which is horizontally driven by a motor or actuator such as a stepping motor (pulse motor) or piezoelectric actuator. The sample S to be observed by the image acquisition device M, an example of which is a living sample such as a cell, is mounted on the stage 1 while being sealed with a glass slide. Driving the stage 1 within the XY plane can move the imaging position with respect to the sample S.

The stage 1 can move back and forth between the macro-image acquisition device M1 and micro-image acquisition device M2 and functions to transfer the sample S therebetween. When acquiring a macro image, a total image of the sample S can be captured at once or images of the sample S may be captured as being divided into a plurality of regions. Both of the macro-image acquisition device M1 and micro-image acquisition device M2 may be provided with respective stages 1.

Arranged on the bottom face side of the stage 1 are a light source 2 for emitting light to the sample S and a condensing lens 3 for condensing the light from the light source 2 to the sample S. The light source 2 may be arranged such as to emit light obliquely to the sample S. Arranged on the upper face side of the stage 1 are a lightguide optical system 4 for guiding an optical image from the sample S and an imaging device 5 for capturing the optical image of the sample S. The lightguide optical system 4 has an imaging lens 6 which focuses the optical image from the sample S onto an imaging surface of the imaging device 5. An example of the imaging device 5 is an area image sensor which can acquire a two-dimensional image. The imaging device 5 acquires through the lightguide optical system 4 a total image of the optical image of the sample S incident on the imaging surface and stores it into a virtual slide image storage unit 39 which will be explained later.

As illustrated in FIG. 2, on the bottom face side of the stage 1, the micro-image acquisition device M2 has a light source 12 and a condensing lens 13 which are similar to those in the macro-image acquisition device M1. Arranged on the upper face side of the stage 1 is a lightguide optical system 14 which guides the optical image from the sample S. An excitation light, irradiation optical system for irradiating the sample S with excitation light or a dark field illumination optical system for acquiring a dark field image of the sample S may be employed as an optical system for irradiating the sample S with light from the light source 12.

The lightguide optical system. 4 has an objective lens 15 arranged so as to oppose the sample S and a beam splitter (light splitting means) 16 arranged behind the objective lens 15. The objective lens 15 is provided with a motor or actuator such as a stepping motor (pulse motor) or piezoelectric actuator which drives the objective lens 15 in the Z direction orthogonal to the mounting surface of the stage 1. Changing the position of the objective lens 15 in the Z direction can adjust the focal position of imaging when acquiring an image of the sample S. The focal position may be adjusted by changing the position of the stage 1 in the Z direction or changing positions of both of the objective lens 15 and stage 1 in the Z direction.

The beam splitter 16 is a part which splits the optical image of the sample S into a first optical path L1 for image acquisition and a second optical path L2 for focus control. The beam splitter 16 is arranged at an angle of about 45 degrees with respect to the optical axis from the light source 12; in FIG. 2, an optical path passing through the beam splitter 16 is the first optical path L1, while an optical path reflected by the beam splitter 16 is the second optical path.

Arranged in the first optical path L1 are an imaging lens 17 for forming an optical image (first optical image) of the sample S having passed through the beam splitter 16 and a first imaging device (first imaging means) 18 having an imaging surface placed at the image-forming position of the imaging lens 17. A two-dimensional CCD image sensor which can be driven in TDI (Time Delay Integration) or a line sensor is used for the first imaging device 18, which is a device adapted to acquire a one-dimensional image (first image) formed by the first optical image of the sample S. In a scheme which sequentially secures images of the sample S while controlling the stage 1 at a fixed speed, the first imaging device 18 may be a device which can acquire a two-dimensional image, such as CMOS and CCD image sensors. The first images captured by the first imaging device 18 are sequentially stored in a temporary storage memory such as a lane buffer and then compressed, so as to be outputted to an image generator 38 which will be explained later.

Arranged in the second optical path L2, on the other hand, a field adjustment lens 19 for reducing an optical image (second optical image) of the sample reflected by the beam splitter 16 and a second imaging device (second imaging means) 20. Arranged in front of the second imaging device 20 is an optical path difference generating member 21 for generating an optical path difference in the second optical image. Preferably, the field adjustment lens 19 is constructed such that the second optical image is focused on the second imaging device 20 with a size on a par with that of the first optical image.

Figure 3:
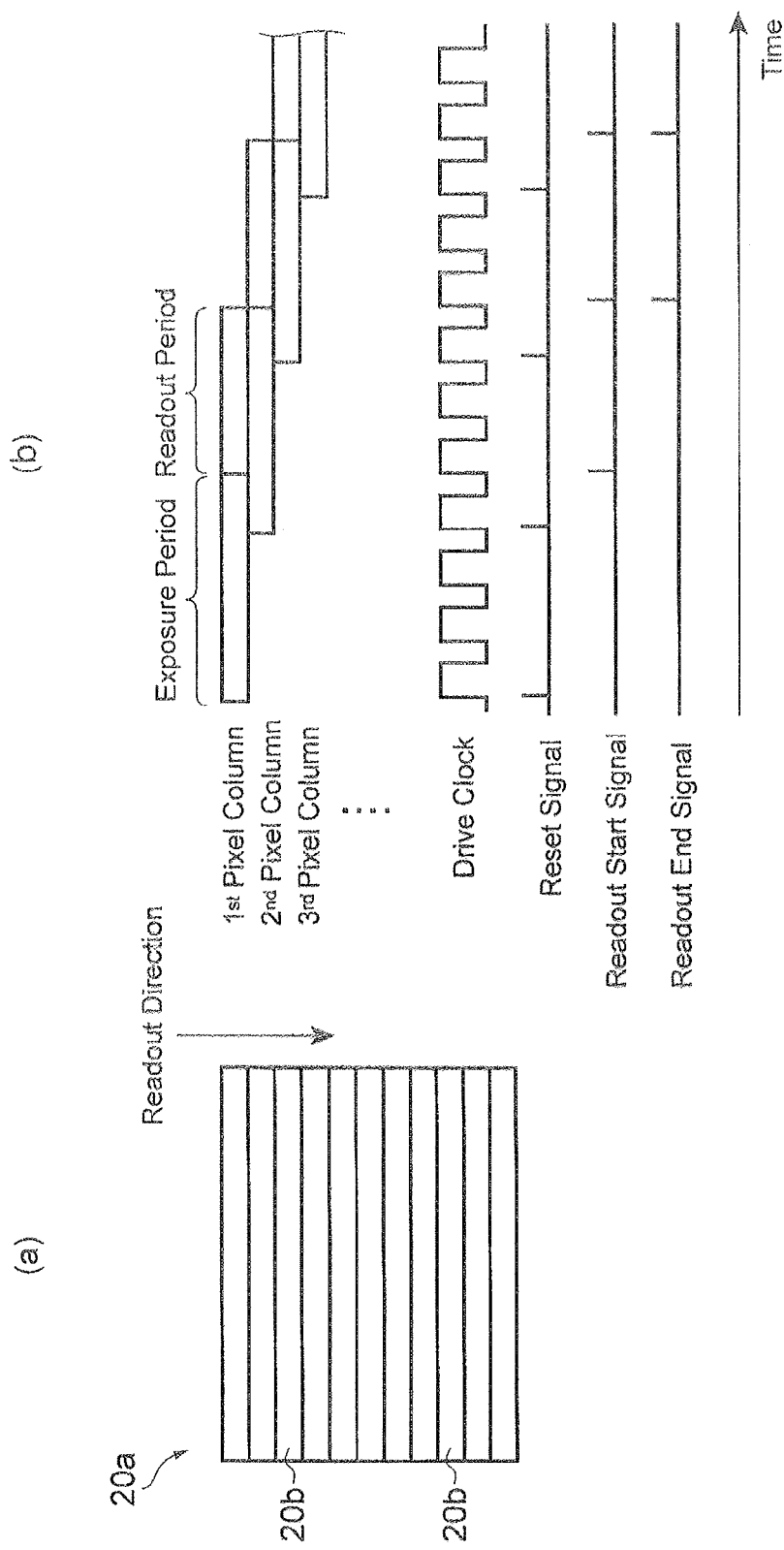
FIG. 3 is a diagram illustrating an example of a second imaging device.

The second imaging device 20 is a device adapted to acquire a two-dimensional image (second image) formed by the second optical image of the sample S. The second imaging device 20 has a two-dimensional image pickup element which is adapted to perform rolling readout while including a plurality of pixel columns. An example of such a two-dimensional image pickup element is a CMOS image sensor. The second imaging device 20 has an imaging surface 20a arranged so as to substantially coincide with the XZ plane orthogonal to the second optical path L2. As illustrated in FIG. 3(*a*), a plurality of pixel columns 20b, each of which is constructed by arranging a plurality of pixels in a direction perpendicular to a readout direction, align in the readout direction on the imaging surface 20a of the second imaging device 20.

As illustrated in FIG. 3(*b*), the second imaging device 20 outputs a reset signal, a readout start signal, and a readout end signal according to a drive period of a drive clock, thereby controlling exposure and readout for each pixel column 20b. An exposure period of one pixel column 20b is a duration from discharge of electric charges triggered by the reset signal to readout of the electric charges triggered, by the readout start signal. A readout period of one pixel column 20b is a duration from the start of readout of electric charges triggered by the readout start signal to an end of readout of electric charges triggered by the readout end signal. The readout start signal for the next pixel column can also be used as the readout end signal.

In the rolling readout, readout start signals to be outputted for the respective pixel columns 20b are sequentially outputted with a predetermined time difference. The readout speed in the rolling readout is controlled by a time interval of the readout start signals for reading the respective pixel columns 20b. The readout speed becomes faster and slower as the time interval of readout start signals is shorter and longer, respectively. The readout interval between the pixel columns 20b, 20b adjacent to each other can be adjusted by techniques such as adjustment of the frequency of the drive clock, setting of a delay period in the readout period, and change of a clock number specifying the readout start signal, for example.

The optical path difference generating member 21 is a glass member which generates an optical path difference in the second optical image along an in-plane direction of the imaging surface 20a. In an example illustrated in FIG. 4(a), the optical path difference generating member 21 is shaped into a prism having a right triangular cross section and is arranged such as to increase its thickness continuously along the moving direction (Z direction) of the second optical image on the imaging surface 20a caused by the scanning of the sample S. The optical path difference generating member 21 is also arranged such as to have a flat surface tilted from a plane orthogonal to the optical axis of the second optical path L2. Therefore, the second optical image incident on the imaging surface 20a increases its optical path as it travels from one end part (the upper end part in FIG. 4(b)) to the other end part (the lower end part in FIG. 4(b)) in the Z direction on the imaging surface 20a. Preferably, the optical path difference generating member 21 is arranged such that a surface opposing the second imaging device 20 is parallel to the imaging surface 20a of the second imaging device. This can reduce the refraction of light caused by the surface opposing the second imaging device 20, thereby securing a quantity of light received by the second imaging device 20.

Figure 5:
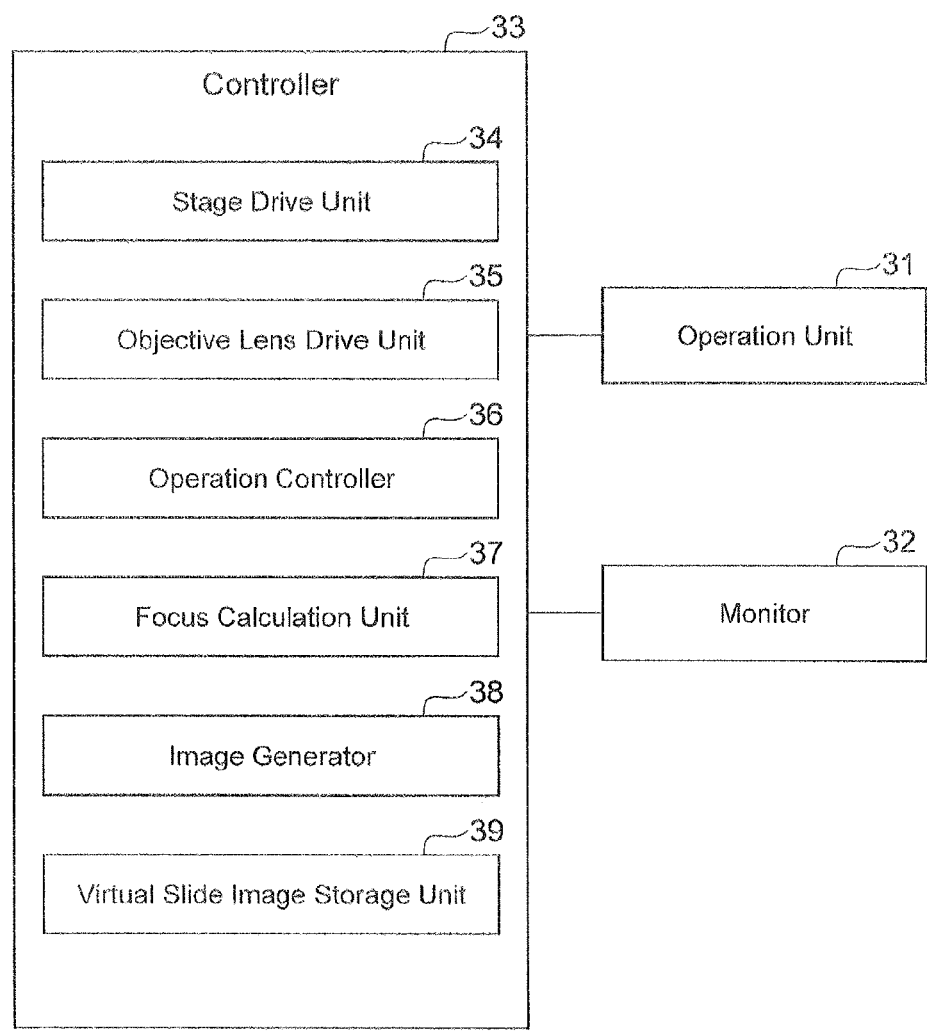
FIG. 5 is a block diagram illustrating functional constituents of the image acquisition device.

FIG. 5 is a block diagram illustrating functional constituents of an image acquisition device. As illustrated in the diagram, an image acquisition device M is equipped with a computer system comprising a CPU, a memory, a communication interface, a storage unit such as a hard disk, an operation unit 31 such as a keyboard, a monitor 32, and the like. The image acquisition device M also comprises a stage drive unit 34, an objective lens drive unit 35, an operation controller 36, a focus calculation unit 37, the image generator 38, and the virtual slide image storage unit 39 as functional constituents of the controller 33.

The stage drive unit 34 is a part which functions as a field drive means for moving a field position of the objective lens 15 with respect to the sample S. The stage drive unit 34 is constituted by a motor or actuator such as a stepping motor (pulse motor) or piezoelectric actuator, for example. Under the control of the operation controller 36, the stage drive unit 34 moves the stage 1 in the XY directions along a plane having a predetermined angle (e.g., 90°) with respect to a plane orthogonal to the optical axis of the objective lens 15. As a consequence, the sample S secured to the stage 1 moves relative to the optical axis of the objective lens 15, thereby shifting the field position of the objective lens 15 with respect to the sample S.

More specifically, under the control of the operation controller 36, the stage drive unit 34 scans the stage 1 having the sample S mounted thereon at a predetermined speed. Scanning the stage 1 relatively moves the imaging fields of the sample S in the first and second imaging devices 18, 20 in sequence. For capturing an image of the sample S as a whole, the image acquisition device M controls the operation controller 36 so as to move the field position of the objective lens 15 with respect to the sample S in scan directions along imaging lines Ln (n is a natural number) constituted by a plurality of divisional regions 40.

Figure 6:
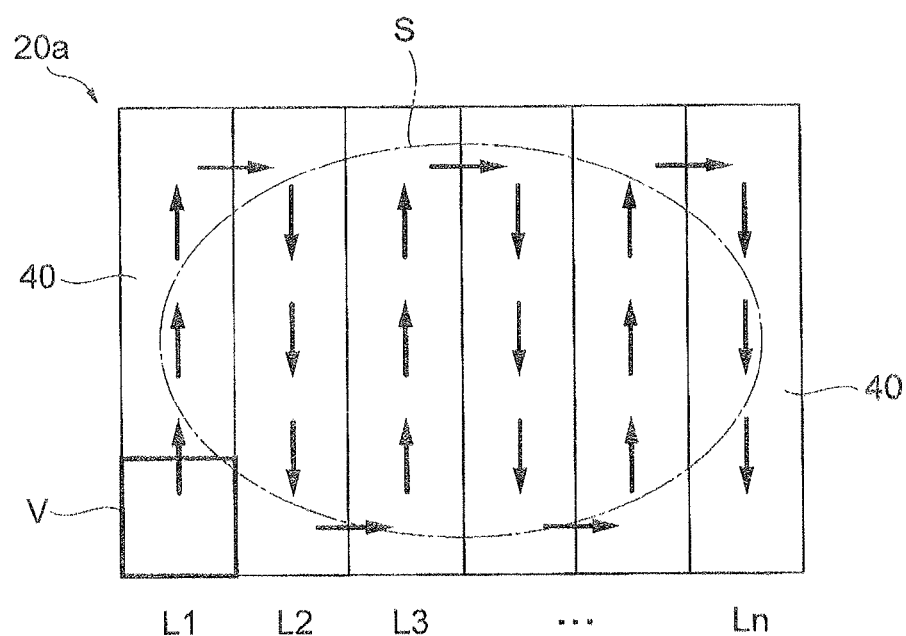
FIG. 6 is a diagram illustrating an example of scanning a field of an objective lens with respect to a sample.

For moving the field position of the objective lens 15 with respect to the sample S between the imaging lines Ln adjacent to each other, bidirectional scanning in which scan directions are reversed between the imaging lines Ln adjacent to each other, for example, is employed as illustrated in FIG. 6. Unidirectional scanning in which the same scan direction is used for all the imaging lines Ln may be employed as well. Also employable is random scanning in which the field position of the objective lens 15 moves randomly among the divisional regions 40.

Though the scanning speed of the stage 1 is constant during image acquisition, there is a period in which the scanning speed is unstable under the influence of vibrations of the stage 1 and the like immediately after starting the scan in practice. It is therefore preferable to set a scan width longer than the divisional regions 40, so that each of an acceleration period in which the stage 1 is accelerated, a stabilization period required for the scanning speed of the stage 1 to stabilize, and a deceleration period in which the stage 1 decelerates occurs when the outside of the divisional regions 40 is scanned. This makes it possible to acquire an image during a fixed speed period in which the scanning speed of the stage 1 is constant. Imaging may be started during the stabilization period, and the part of data acquired during the stabilization period may be deleted after acquiring the image. Such a technique is suitable when using an imaging device which is required to read blank data.

As with the stage controller 34, the objective lens controller 35 is constituted by a motor or actuator such as a stepping motor (pulse motor) or piezoelectric actuator, for example. Under the control of the operation controller 36, the objective lens controller 35 moves the objective lens 15 in the Z direction along the optical axis of the objective lens 15. This shifts the focal position of the objective lens 15 with respect to the sample S.

Preferably, the objective lens drive unit 35 does not drive the objective lens 15 during the analysis of the focal position by the focus calculation unit 37, but only unidirectionally along the Z direction until analysis for the next focal position is started. In this case, a focal position analysis period and a period of driving the objective lens according to a result of analysis occur alternately during the scanning of the sample S. Keeping the positional relationship between the objective lens 15 and sample S unchanged during the analysis of the focal position can secure the accuracy of analyzing the focal position.

The operation controller 36 is a part which controls operations of the second imaging device 20 and stage drive unit 34. More specifically, the operation controller 36 synchronizes the movement of a predetermined part of the sample S within a field V of the objective lens 15 caused by the stage drive unit 34 with the rolling readout of the second imaging device 20 such that each pixel column 20b of the second imaging device 20 is exposed to the optical image of the predetermined part in the sample S.

Figure 7:
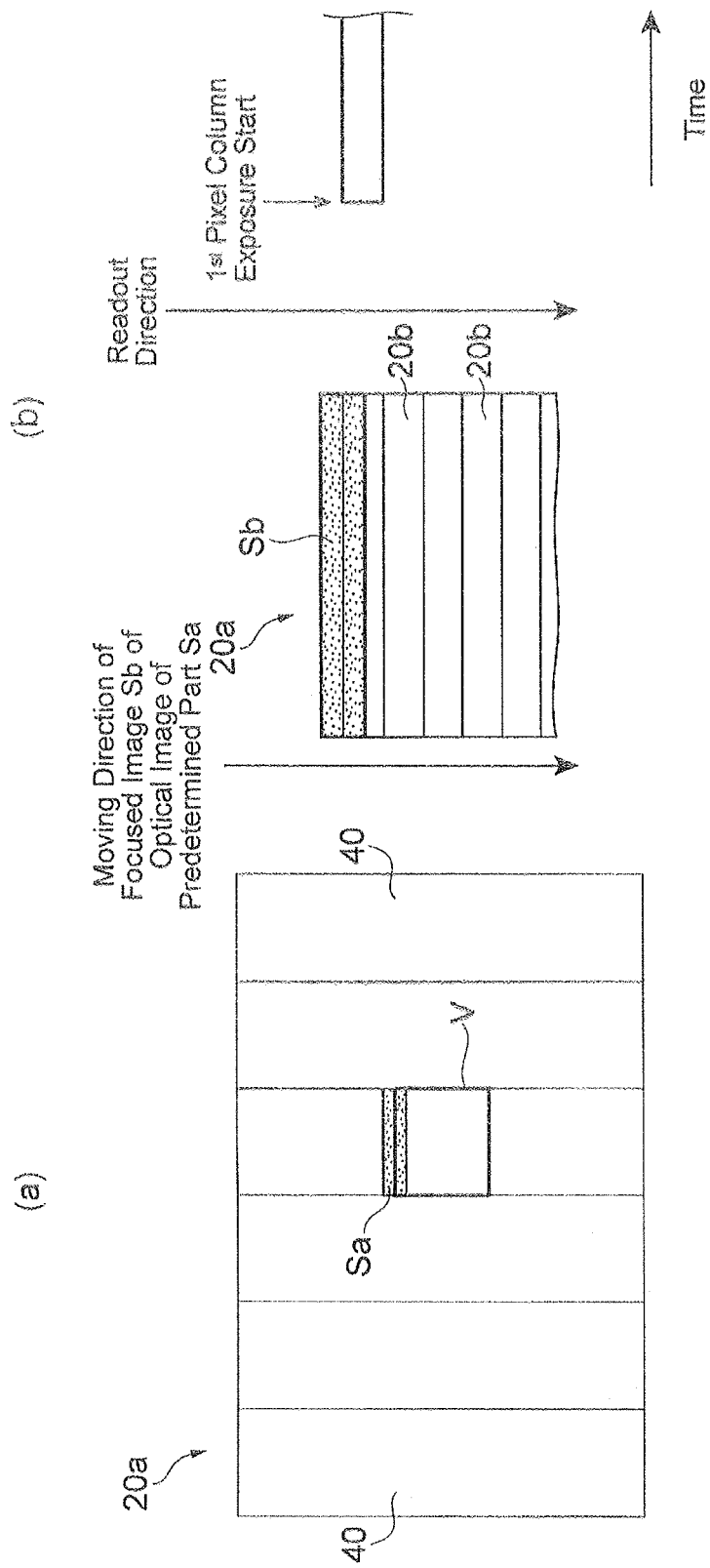
FIG. 7 is a diagram illustrating how movement of a predetermined part of the sample within the field of the objective lens and rolling readout of the second imaging device are synchronized with each other, in which (a) represents the positional relationship between the field of the objective lens and divisional regions, while (b) exhibits the predetermined part of the sample with respect to each pixel column and timings at which an image pickup element is exposed and read out.

As illustrated in FIG. 7(a), the operation controller 36 controls the stage drive unit 34 such that the sample S moves at a fixed speed within the field V of the objective lens 15 when the field V of the objective lens 15 moves within one divisional region 40. As illustrated in FIG. 7(b), the operation controller 36 also controls the stage drive unit 34 and second imaging device 20 such that the moving direction of a focused image Sb of the optical image of the sample S on the imaging surface 20a of the second imaging device 20 and the readout direction of each pixel column 20b of the imaging surface 20 coincide with each other. When an image pickup element which can variably set readout speeds for the rolling readout is used, the operation controller 36 may change the readout speed for the rolling readout according to the moving speed of the sample S within the field V of the objective lens 15.

The exposure time in each pixel column 20b is set according to at least the width in the scan direction of a predetermined part Sa of the sample S and the moving speed of the predetermined part Sa of the sample S within the field V of the objective lens 15. More preferably, magnifications of the objective lens 15 and field adjustment lens 19 are also taken into consideration. This enables each pixel column 20b to be exposed to an optical image of the predetermined part Sa of the sample S.

Figure 8:
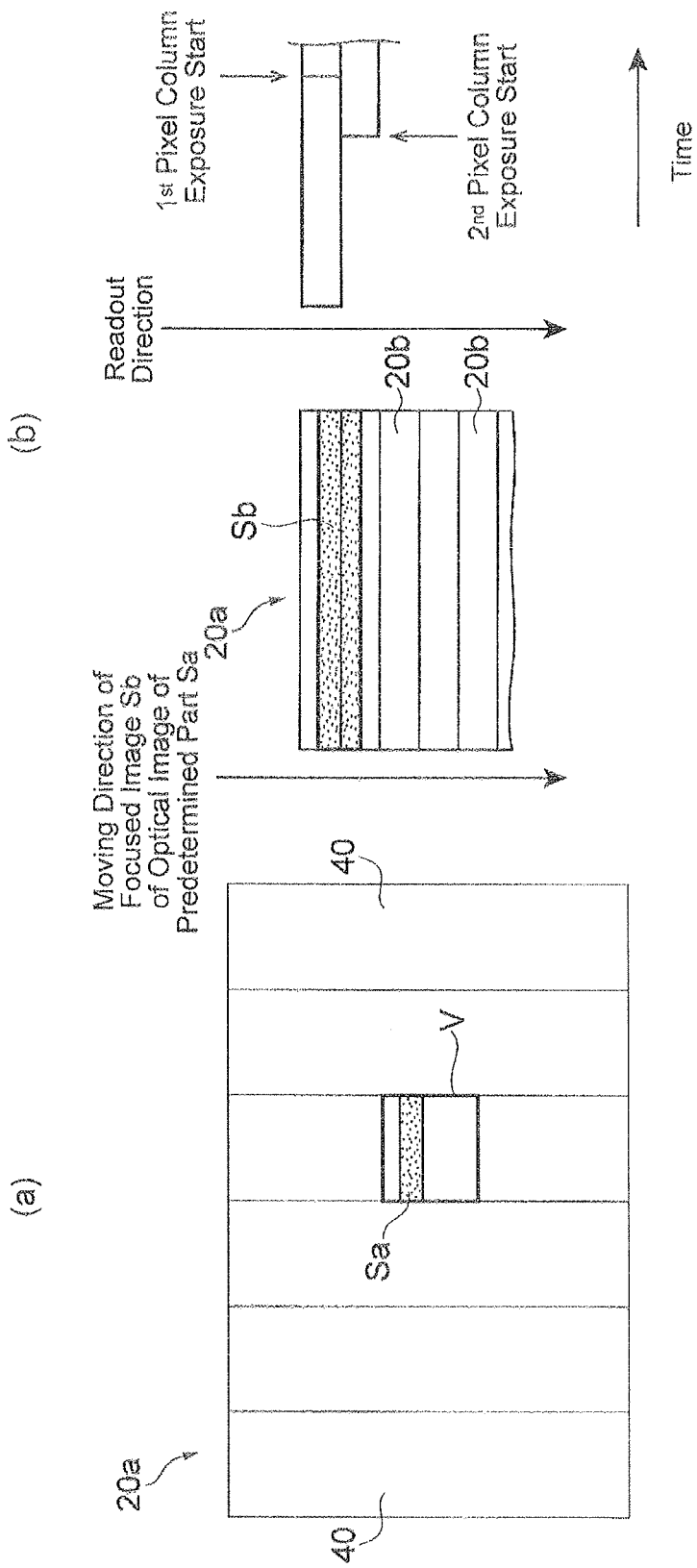
FIG. 8 is a diagram illustrating a state subsequent to FIG. 7.

When the focused image Sb of light, from the predetermined part Sa of the sample S on the imaging surface 20a of the second imaging device 10 reaches the first pixel column 20b of the imaging region at time T1 as illustrated in FIG. 7(b), the exposure of the first pixel column 20b starts. At time 12, the position of the predetermined part Sa of the sample S moves within the field V of the objective lens 15 as illustrated in FIG. 8(a). At this time, as illustrated in FIG. 8(b), the focused image Sb of light from the predetermined part Sa of the sample S reaches the second pixel column 20b of the imaging region, whereupon the exposure of the second pixel column 20b starts. At the timing when the focused image Sb of light from the predetermined part Sa of the sample S passes through the first pixel column 20b, the readout of the first pixel column 20b starts.

Figure 9:
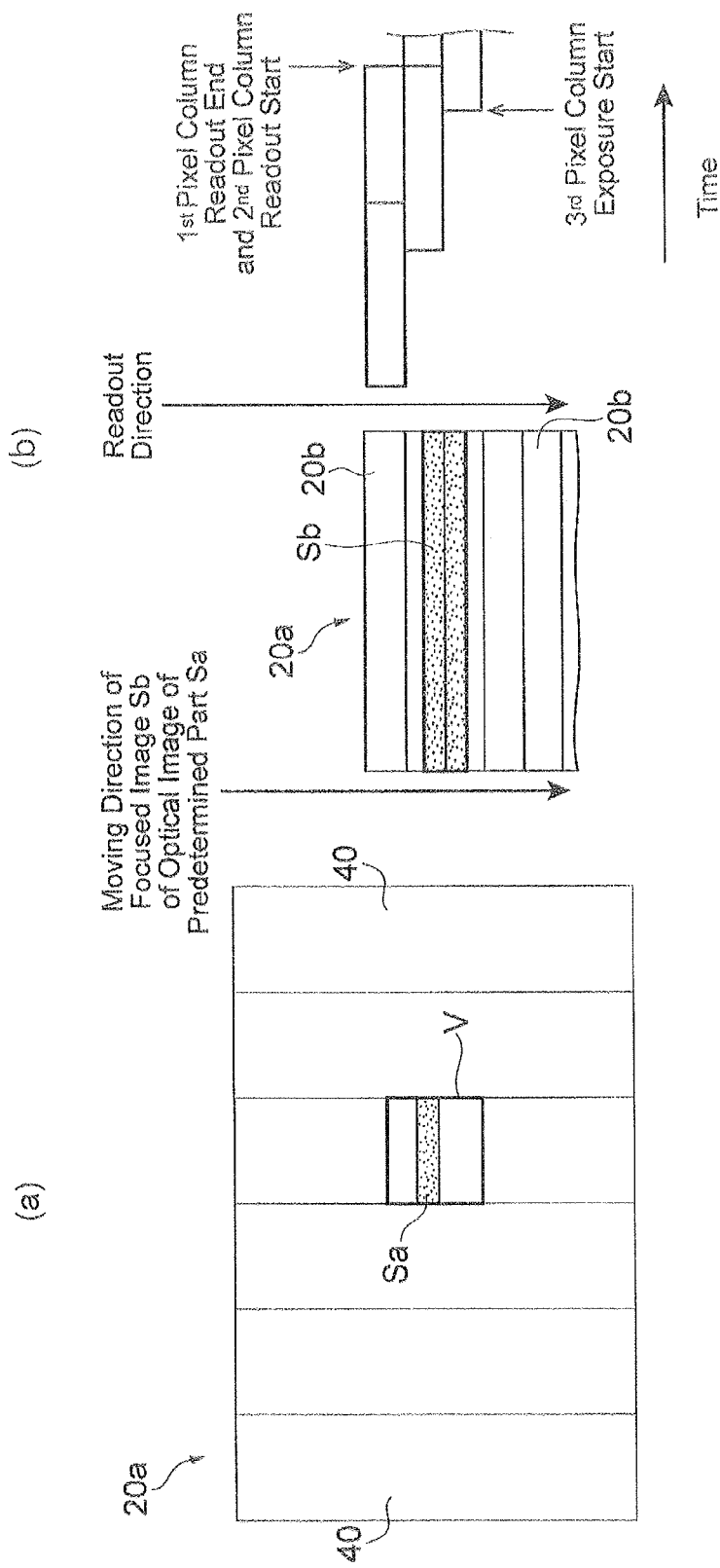
FIG. 9 is a diagram illustrating a state subsequent to FIG. 8.

At time T3, as illustrated in FIG. 9(a), the position of the predetermined part Sa of the sample S within the field V of the objective lens S further moves in the scan direction. At this time, as illustrated in FIG. 9(b), the focused image Sb of light from the predetermined part Sa of the sample S reaches the third pixel column 20b, whereupon the exposure of the third pixel column 20b starts. At the timing when the focused image Sb of light from the predetermined part Sa of the sample S passes through the second pixel column 20b, the readout of the second pixel column 20b starts. Concurrently with starting the readout of the second pixel column 20b, the readout of the first pixel column 20b ends.

Subsequently, the movement of the predetermined part Sa of the sample S within the field V of the objective lens 15 and the rolling readout at the pixel column 20b are performed in the same procedure until a predetermined number of pixel columns is reached. The image data read out from each pixel column 20b is image data concerning the same part of the sample S. Since the optical path difference generating member 21 is arranged in the second optical path L2, the image data read out from each pixel column 20b includes contrast information equivalent to that obtained when the focal position of the objective lens 15 is changed with respect to the same part of the sample S. The image data read out from the pixel columns 20b are sequentially outputted to the focus calculation unit 37.

It is preferred for the second imaging device 20 to be able to switch readout directions of the rolling readout. This can easily make the moving direction of the focused image Sb of light from the sample S and the readout direction of each pixel column 20b of the second imaging device 20 coincide with each other even when the scan direction of the field position of the objective lens 15 with respect to the sample S changes as in bidirectional scan and random scan.

When the objective lens drive unit 35 is capable of moving the lightguide optical system 14 including the objective lens 15 in the XY directions, the operation controller 36 may synchronize the movement of a predetermined part of the sample S within the field V of the objective lens 15 caused by the objective lens drive unit 35 with the rolling readout of the second imaging device 20 such that each pixel column 20b of the second imaging device 20 is exposed to the optical image of the predetermined part in the sample S. In this case, the objective lens drive unit 35 functions as a field drive means for moving the field position of the objective lens 15 with respect to the sample S.

The focus calculation unit 37 is a part which analyzes the second image acquired by the second imaging device 20 and calculates focus information of the sample S according to a result of the analysis. As a scheme for calculating the focus information in the focus calculation unit 37, a front/back focus scheme or a contrast distribution scheme is employed, for example.

When using the front/back focus scheme, the focus calculation unit 37 selects at least two pixel columns 20b in the pixel columns 20b of the second imaging device 20. As mentioned above, the optical path difference generating member 21 is arranged in the second optical path L2 such as to increase its thickness continuously along the moving direction (Z direction) of the second optical image on the imaging surface 20a caused by the scanning of the sample S. Therefore, according to the positions of the two pixel columns 20b selected, the second imaging device 20 can acquire a (front focus) optical image whose focus is in front of the first optical image incident on the first imaging device 18 and a (back focus) optical image whose focus is behind, the first optical image. The focus calculation unit 37 determines the difference between the respective contrast values of image data read out from the selected pixel columns 20b.

When the focal position of the objective lens 15 is on the surface of the sample S as illustrated in FIG. 10, the front focus image contrast value and the back focus image contrast value substantially coincide with each other, whereby the difference value therebetween becomes substantially zero. When the distance to the surface of the sample S is longer than the focal length of the objective lens 15 as illustrated in FIG. 11, on the other hand, the back focus image contrast value is greater than the front focus image contrast value, thus yielding a positive difference value therebetween. In this case, the focus calculation unit 37 outputs to the objective lens drive unit 35 such instruction information as to make it drive the objective lens 15 toward the sample S. When the distance to the surface of the sample S is shorter than the focal length of the objective lens 15 as illustrated in FIG. 12, the back focus image contrast value is smaller than the front focus image contrast value, thus yielding a negative difference value therebetween. In this case, the focus calculation unit 37 outputs to the objective lens drive unit 35 such instruction information as to make it drive the objective lens 15 away from the sample S.

When using the front/back focus scheme, the focus calculation unit 37 selects the respective pixel columns 20b equivalent to the front and back focuses such that they are symmetrical about the pixel column 20b corresponding to the focus center. By the pixel column 20b corresponding to the focus center is meant the pixel column 20b on which is incident an optical image of the sample S having passed through the second optical path L2 and optical path difference generating member 21 by an optical path length coinciding with the optical path length of the optical image of the sample S captured by the first imaging device 18. When the pixel column 20b corresponding to the focus center is the $k^{th}$ pixel column 20b, for example, the focus calculation unit 37 selects the $(k-m)^{th}$ pixel column 20b and $(k+m)^{th}$ pixel column 20b. Setting m according to the degree of irregularities of the sample S can improve the accuracy of focus information.

Figure 13:
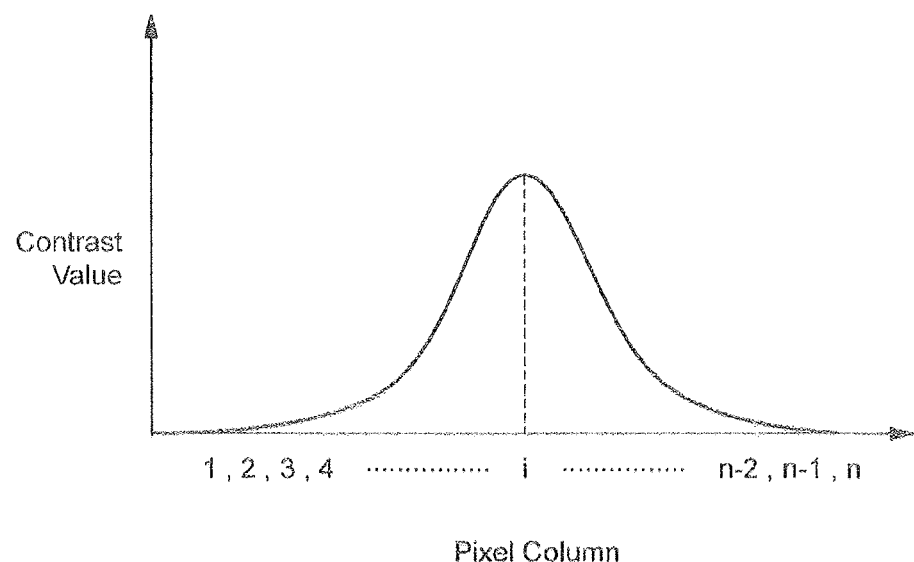
FIG. 13 is a diagram illustrating an example of contrast information processed by a focus calculation unit.

When using the contrast distribution scheme, the focus calculation unit 37 acquires contrast information of image data from a plurality of pixel columns 20b of the second imaging device 20. In an example illustrated in FIG. 13, which represents contrast values of image data from the first pixel column 20b to the $n^{th}$ pixel column 20b in the second imaging device 20, the contrast value of the image data in the $i^{th}$ pixel column 20b is a peak value. In this case, assuming that the focal position of the objective lens 15 is an in-focus position at the time when the $i^{th}$ pixel column is exposed to the predetermined part Sa of the sample S, the focus calculation unit 37 generates focus information. As the contrast value, the contrast value in a specific pixel in the pixels included in each pixel column 20b or an average value of contrast values in part or whole of the pixels included in each pixel column 20b.

The image generating unit 38 is a part which combines the acquired images, so as to generate a virtual slide image. The image generating unit 38 sequentially receives first images outputted from the first imaging device 18, i.e., respective images of the divisional regions 40, and combines them, so as to synthesize an image of the whole sample S. According to thus synthesized image, it produces an image having a resolution lower than the synthesized image and stores the high- and low-resolution images in association with each other in the virtual slide storage unit 39. The virtual slide storage unit 39 may further associate them with images acquired by the macro-image acquisition device M1. The slide image may be stored as a single image or a plurality of divided images.

A focusing operation in the above-mentioned image acquisition device M will now be explained.

Figure 14:
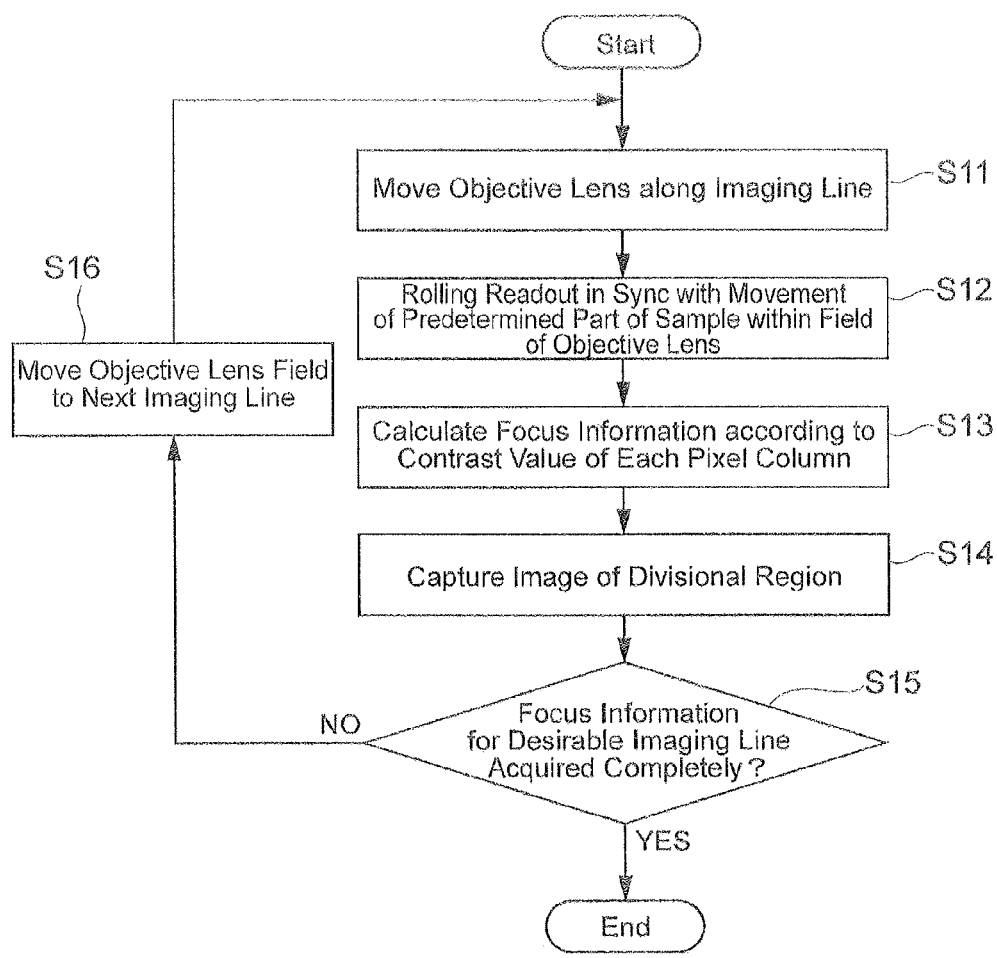
FIG. 14 is a flowchart illustrating focusing operations of the image acquisition devices illustrated in FIGS. 1 and 2.

In the image acquisition device M, as illustrated in FIG. 14, when the stage drive unit 34 starts moving the stage 1, the field V of the objective lens 15 shifts along one imaging line Ln (step S11). The movement of the predetermined part Sa of the sample S within the field V of the objective lens 15 and the rolling readout of the second imaging device 20 are synchronized with each other such that each pixel column 20b of the second imaging device 20 is exposed to the focused image Sb of the optical image from the predetermined part Sa in the sample S (step S12). While the focus information in the divisional region 40 is calculated according to the contrast value of the image data acquired in each pixel column 20b (step S13), the focal position of the objective lens 15 is adjusted according to the calculated focus information, and an image of the divisional region 40 is captured (step S14). Thereafter, it is determined whether or not the calculation of focus information has completely been acquired for the desirable imaging line Ln (step S15); when the calculation of focus information has not completely been acquired, the field V of the objective lens 15 moves to the next imaging line Ln (step S16), whereupon the processing of steps S11 to S15 is repeatedly executed.

As explained in the foregoing, by arranging the optical path difference generating member 21, the image acquisition device M can form an optical path length difference of the second optical image without splitting light in the second optical path L2 for focus control. This can suppress the quantity of light required for the second optical path L2 to obtain information of the focal position, whereby a quantity of light can be secured for the first imaging device 18 to capture an image. By utilizing a delay in image data readout timings among the pixel columns 20b in the rolling readout, the image acquisition device M synchronizes the movement of a predetermined part (the same part) of the sample S within the field V of the objective lens 15 with the rolling readout such that each pixel column 20b of the second imaging device 20 is exposed to an optical image of the predetermined part in the sample S. Since the optical path difference generating member 21 is arranged in the second optical path L2, image data from each pixel column 20b includes contrast information equivalent to that obtained when the focal position of the objective lens 15 is changed in the same part of the sample S, whereby the focus information can be calculated rapidly and accurately according to the contrast information.

Since the image acquisition device M constructs the second imaging device 20 by using a two-dimensional image pickup element adapted to perform rolling readout, arranging the optical path difference generating member 21 in the second optical path L2 makes it unnecessary to drive the objective lens 15 when calculating the focus information of the objective lens 15. This can inhibit vibrations and the like from occurring during the focus control.

In the image acquisition device M, the focus calculation unit 37 calculates the focus information of the sample S according to the difference in contrast values of image data read out from at least two pixel columns 20b in the pixel columns 20b of the second imaging device 20. This technique enables the second imaging device 20 to acquire each of a (front focus) optical image whose focus is in front of the optical image incident on the first imaging device 18 and a (back focus) optical image whose focus is behind the incident optical image. Using the difference in contrast values of their image data can calculate the focus information of the sample S accurately. In the image acquisition device M, the focus calculation unit 37 calculates the focus information of the sample S according to a distribution of contrast values in image data read out from the pixel columns 20b of the second imaging device 20. This technique can calculate the focus information of the sample S accurately according to the distribution of contrast values in the image data.

Figure 4:
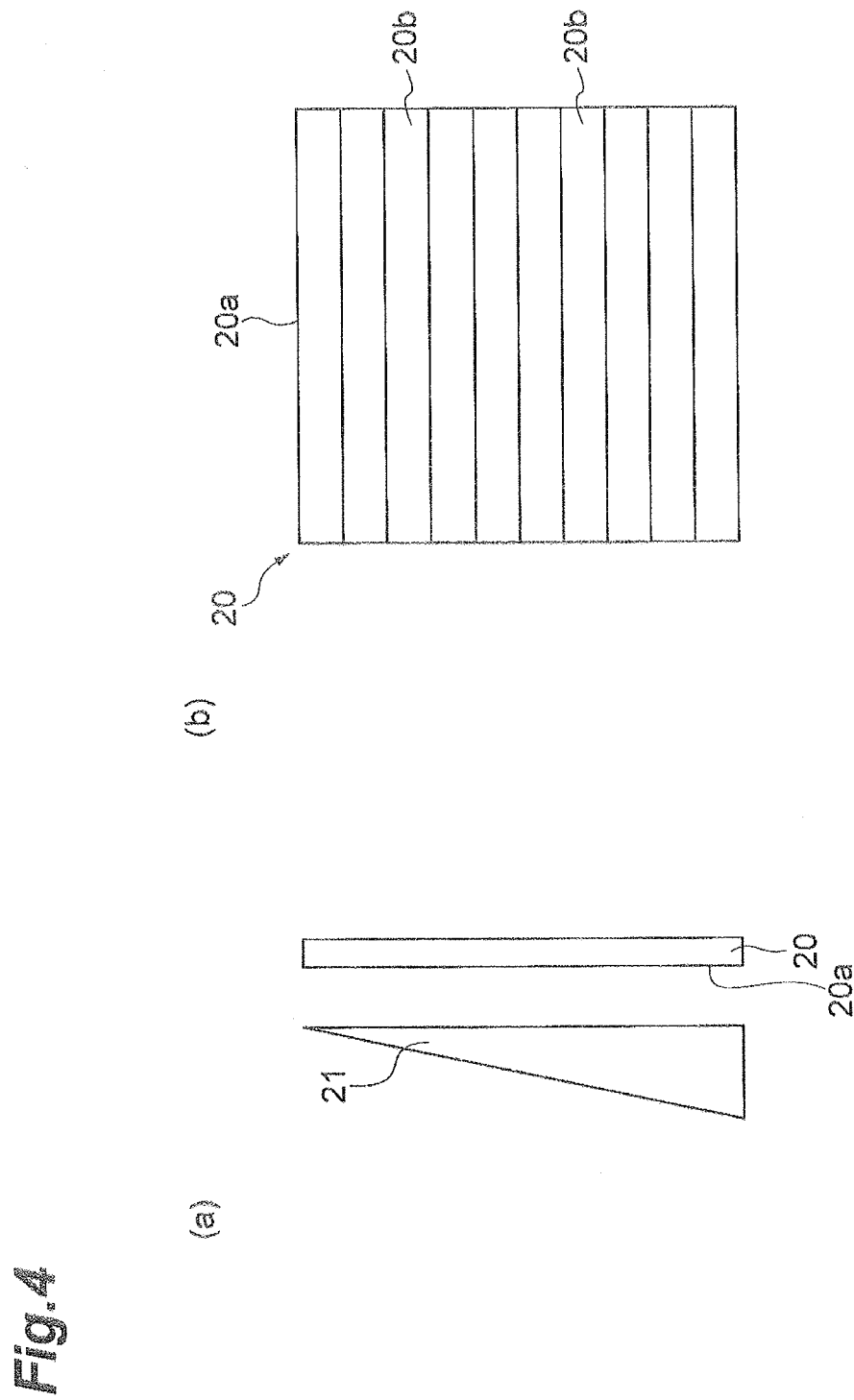
FIG. 4 is a diagram illustrating an example of combinations of an optical path difference generating member and the second imaging device.
Figure 15:
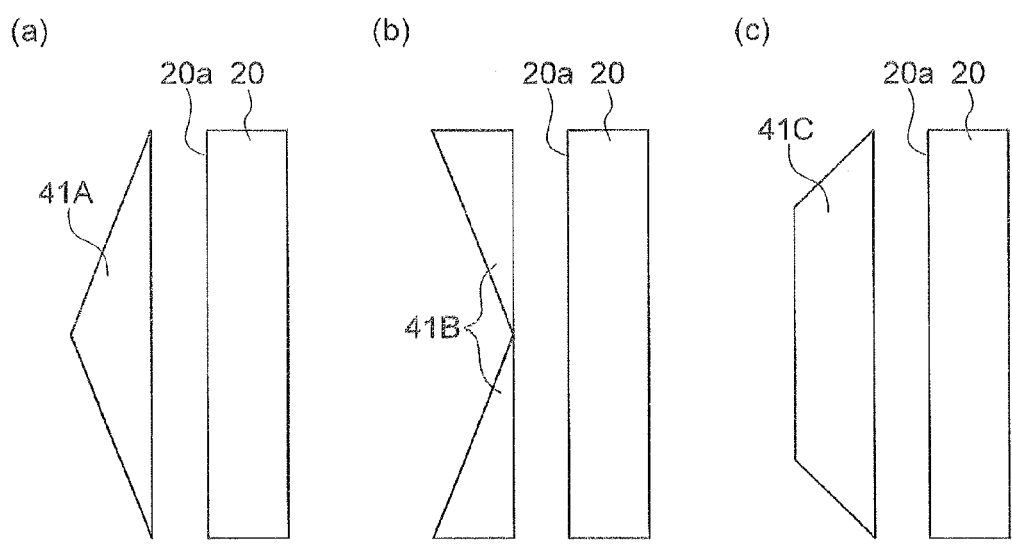
FIG. 15 is a diagram illustrating modified examples of the optical path difference generating member.

When bidirectionally scanning the field position of the objective lens 15 in the case where the front/back focus scheme is used for calculating the focus information of the sample S in the focus calculation unit 37 (see FIG. 6), it is necessary to use an optical path difference generating member in which respective parts continuously increasing and decreasing their thickness are provided symmetrically about the moving direction of the second optical image (Z direction) on the imaging surface 20a caused by the scanning of the sample S as illustrated in FIG. 15 in place of the optical path difference generating member 21 illustrated in FIG. 4.

In an example illustrated in FIG. 15(a), an optical path difference generating member 41A is shaped into a prism having a triangular cross section and arranged such that its top part substantially coincides with a center part in the Z direction of the imaging surface 20a. In this example, the optical path of the second optical image incident on the imaging surface 20a is the longest at the center part in the Z direction of the imaging surface 20a and becomes shorter with decreasing distance to both end parts in the Z direction of the imaging surface 20a. In an example illustrated in FIG. 15(b), an optical path difference generating member 41B is constructed by combining two glass members each shaped into a prism having a right triangular cross section and is arranged such that the glass members overlap one and the other half regions in the Z direction of the imaging surface 20a, respectively. In this example, the optical path is the longest at end parts in the Z direction of the imaging surface 20a and becomes shorter from the end parts to the center in the Z direction of the imaging surface 20a. In an example illustrated in FIG. 15(c), an optical path difference generating member 41C has an isosceles trapezoidal cross section and is arranged such that its slopes overlap one and the other end regions in the Z direction of the imaging surface 20a, respectively. In this example, the optical path length does not change in the center part in the Z direction of the imaging surface 20a but becomes shorter only in end parts in the Z direction with decreasing distance to both ends in the Z direction.

Figure 16:
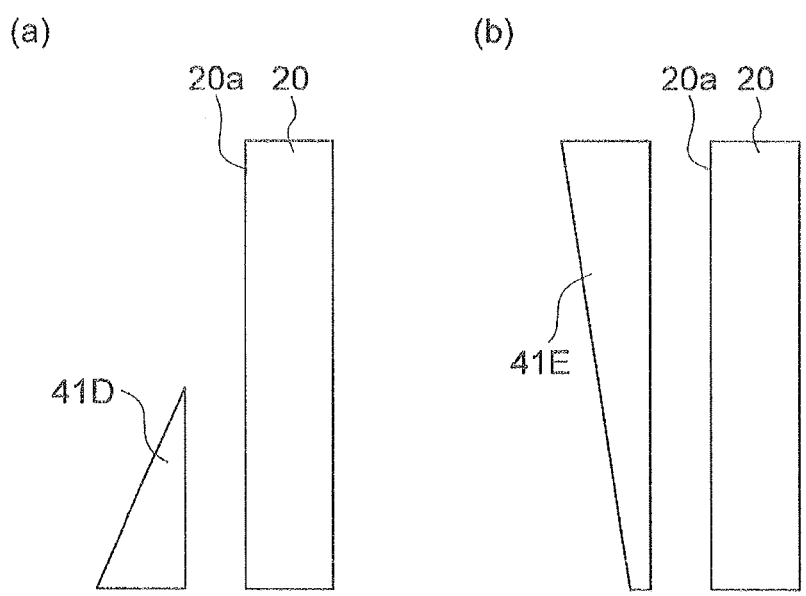
FIG. 16 is a diagram illustrating other modified examples of the optical path difference generating member.

When unidirectionally scanning the field position of the objective lens 15 in the case where the front/back focus scheme is used for calculating the focus information of the sample S in the focus calculation unit 37, optical path difference generating members illustrated in FIG. 16, for example, can be used as well as the optical path difference generating members 21, 31A to 31C.

In an example illustrated in FIG. 16(a), an optical path difference generating member 41D is shaped into a prism having a right triangular cross section and arranged such that a slope thereof overlaps only one half region in the Z direction of the imaging surface 20a. In this example, the optical path becomes shorter with decreasing distance to the center part in the Z direction in the region where the optical path difference generating member 41D is arranged. In an example illustrated in FIG. 16(b), an optical path difference generating member 41E has a trapezoidal cross section and is arranged such that a slope thereof overlaps the whole imaging surface 20a. In this example, the optical path monotonously becomes shorter from one end part side to the other end part side in the Z direction of the imaging surface 20a.

While each of the optical path difference generating members 21, 41A to 41E continuously increases or decreases its thickness, also employable is an optical path difference generating member 51 changing its thickness stepwise as illustrated in FIG. 17 by combining a plurality of glass members having different sizes in the Z direction in the order of size. Using such an optical path difference generating member 51 can also yield operations and effects similar to those of the above-mentioned embodiment. In this case, the difference in size in the Z direction between the glass members is preferably an integer multiple of the size in the Z direction of each pixel column 20b in the second imaging device 20. Preferably, the position of an edge part in the Z direction of each glass member coincides with the position of an edge part in the Z direction of each pixel column 20b.

Though the above-mentioned embodiment illustrates a device which generates a virtual slide image, the image acquisition device in accordance with the present invention is applicable to various devices as long as they acquire images while scanning a sample at a predetermined speed by a stage and the like.

REFERENCE SIGNS LIST

1: stage; 12: light source; 14: lightguide optical system; 15: objective lens; 16: beam splitter (light splitting means); 18: first imaging device (first imaging means); 20: second imaging device (second imaging means); 20a: imaging surface; 20b: pixel column; 21, 41A to 41E, 51: optical path difference generating member; 34: stage drive unit (field drive means); 36: operation controller (operation control means); 37: focus calculation unit (focus calculation means); L1: first optical path; L2: second optical path; M: image acquisition device; M1: macro-image acquisition device; M2: micro-image acquisition device; S: sample; Sa: predetermined part; V: objective lens field.

The invention claimed is:

1. An apparatus for capturing an image, comprising:
a stage configured to support a sample;
a light source configured to emit light to the sample;
an objective lens configured to face to the sample;
a light splitting unit configured to split an optical image of the sample into a first optical path for obtaining a first optical image and a second optical path for obtaining a second optical image;
a stage drive unit configured to move a field position of the objective lens with respect to the sample;
a first imaging unit configured to capture the first optical image;
a second imaging unit configured to capture the second optical image;
a focus calculation unit configured to analyze the second optical image and calculate focus information of the sample according to a result of the analysis;
an operation control unit configured to control operations of the stage drive unit and the second imaging unit; and
an optical path difference generating member configured to generate an optical path difference in the second optical image;
wherein the second imaging unit has a two-dimensional image pickup element, adapted to perform rolling readout, including a plurality of pixel columns; and
wherein the operation control unit is configured to synchronize between movement of a predetermined part of the sample within a field of the objective lens caused by the field drive unit and readout of each pixel column of the two-dimensional image pickup element by rolling readout of the two-dimensional image pickup element.

2. The apparatus according to claim 1, wherein the optical path difference generating member has a flat surface tilted from a plane orthogonal to an optical axis of the second optical path.

3. The apparatus according to claim 1, wherein the focus calculation unit calculates the focus information of the sample according to a difference in contrast values of image data read out from at least two pixel columns in the pixel columns of the two-dimensional image pickup element.

4. The apparatus according to claim 1, wherein the focus calculation unit calculates the focus information of the sample according to a distribution of contrast values in image data read out from the pixel columns of the two-dimensional image pickup element.

5. A method for capturing an image, comprising:
acquiring an optical image of a sample on a stage;
moving the stage at a moving speed;
splitting the optical image into a first optical path for obtaining a first optical image and a second optical path for obtaining a second optical image;
capturing the first optical image and the second optical image; and
analyzing the second optical image and calculate focus information of the sample according to a result of the analysis;
arranging an optical path difference generating member for generating an optical path difference in the second optical image;
using a two-dimensional image pickup element, adapted to perform rolling readout, including a plurality of pixel columns for obtaining the second optical image; and
synchronizing movement of a predetermined part of the sample within a field of an objective lens with readout of each pixel column.

* * * * *